United States Patent [19]
Bush

[11] Patent Number: 5,236,992
[45] Date of Patent: Aug. 17, 1993

[54] CARBON BLACKS AND THEIR USE IN RUBBER APPLICATIONS

[75] Inventor: Ted W. Bush, Carlisle, Mass.

[73] Assignee: Cabot Corporation, Boston, Mass.

[21] Appl. No.: 793,145

[22] Filed: Nov. 18, 1991

[51] Int. Cl.$^5$ .............................................. C09C 1/48
[52] U.S. Cl. ................................... 524/495; 423/449.1
[58] Field of Search ..................... 423/495, 449.1; 524/495

[56] References Cited
U.S. PATENT DOCUMENTS

| | | | |
|---|---|---|---|
| 4,075,156 | 2/1978 | Johnson | 423/445 |
| 4,221,772 | 9/1980 | Eisenmenger et al. | 423/445 |
| 4,933,107 | 6/1990 | Watanobe et al. | 524/495 |

FOREIGN PATENT DOCUMENTS

| | | | |
|---|---|---|---|
| 61-47759 | 3/1986 | Japan | 423/445 |
| 2-103268 | 4/1990 | Japan | 524/495 |

Primary Examiner—Michael Lewis
Assistant Examiner—Stuart L. Hendrickson
Attorney, Agent, or Firm—Lawrence A. Chaletsky; Harry J. Gwinnell

[57] ABSTRACT

Novel carbon blacks having an $I_2No.$ of 48–58 mg/g; a CTAB of 45–55 m$^2$/g; a Tint of 65–75%; a CDBP of 90–100 cc/100 g; and a DBP of 122–132 cc/100 g particularly well suited for use in the production of rubber compositions having reduced extrusion shrinkage properties. Also disclosed are rubber compositions containing the novel carbon blacks.

8 Claims, 1 Drawing Sheet

CARBON BLACKS AND THEIR USE IN RUBBER APPLICATIONS

FIELD OF THE INVENTION

The present invention relates to a class of new and novel furnace carbon blacks which are suitable for various applications and particularly well suited for use in rubber compositions.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as fillers and reinforcing agents in the compounding and preparation of rubber compositions for industrial rubber applications. Rubber compositions for industrial rubber applications include hoses, belts, electrical cable insulation and roofing compounds. Generally hoses, belts and electrical cable insulation are produced through extrusion techniques, i.e. the rubber composition is extruded through a die and then cooled or chemically hardened.

It is generally desirable in the production of rubber compositions to utilize carbon blacks which when incorporated will result in rubber compositions with reduced extrusion shrinkage. As is known to those of ordinary skill in the art, rubber compounds generally swell upon extrusion. This means that the cross sectional area of the extrudate is larger than the cross sectional area of the die opening through which it was forced. A low value for extrusion shrinkage correlates to a situation where compound swelling is reduced, and the extrudate cross sectional area is close to that of the die opening. Such compound behavior results in the compound having the intended size for the desired finished part.

Accordingly, an object of the present invention is the production of new carbon blacks which impart improved extrusion shrinkage properties to natural rubbers, synthetic rubbers and blends of natural and synthetic rubbers in which the carbon blacks are incorporated.

Another object of the present invention is new rubber compositions, advantageous for use in industrial rubber applications, incorporating the new carbon blacks which are characterized by having reduced extrusion shrinkage properties.

Other objects of the present invention will become apparent from the following description and the claims.

SUMMARY OF THE INVENTION

We have discovered new carbon blacks having an Iodine adsorption number ($I_2No.$) of 48-58 mg/g (milligrams $I_2$ per gram carbon black); a CTAB (cetyltrimethyl ammonium bromide absorption value) of 45-55 m$^2$/g (square meters per gram); a Tint value ("Tint") of 65-75%; a CDBP (crushed dibutyl phthalate value) of 90-100 cc/100 g (cubic centimeters of dibutyl phthalate per 100 grams carbon black); and a DBP (dibutyl phthalate value) of 122-132 cc/100 g. Preferably, the carbon blacks have an $I_2No.$ of 51-55 mg/g, CTAB of 48-52 m$^2$/g, a Tint Value of 68-72%, a CDBP of 91-95 cc/100 g, and a DBP of 128-132 cc/100 g. We have also discovered a new class of rubber compositions containing the carbon blacks.

The carbon blacks of the present invention may be produced in a furnace carbon black reactor having a first (combustion) zone, a transition zone, and a reaction zone. A carbon black yielding feedstock is injected into a hot combustion gas stream. The resultant mixture of hot combustion gases and feedstock passes into the reaction zone. Pyrolysis, of the carbon black yielding feedstock, is stopped by quenching the mixture when the carbon blacks of the present invention have been formed. Preferably pyrolysis is stopped by a quench injecting a quenching fluid. The process for preparing the novel carbon black of the present invention will be described in greater detail hereinafter.

The rubbers for which the novel carbon black of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are natural rubber, synthetic rubber and their derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinylpyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene. Another preferred rubber composition is an ethylene-propylene diene monomer (EPDM) that is particularly well suited for use in industrial rubber applications.

An advantage of the carbon blacks of the present invention is that the carbon blacks impart increased reinforcement and reduced extrusion shrinkage to compositions containing natural rubbers, synthetic rubbers or blends thereof in which the carbon blacks of the present invention are incorporated.

An advantage of the rubber compositions of the present invention is that the rubber compositions are particularly well suited for use in industrial rubber applications.

Other advantages of the present invention will become apparent from the following more detailed description of the invention.

DETAILED DESCRIPTION OF THE INVENTION

Figure 1:
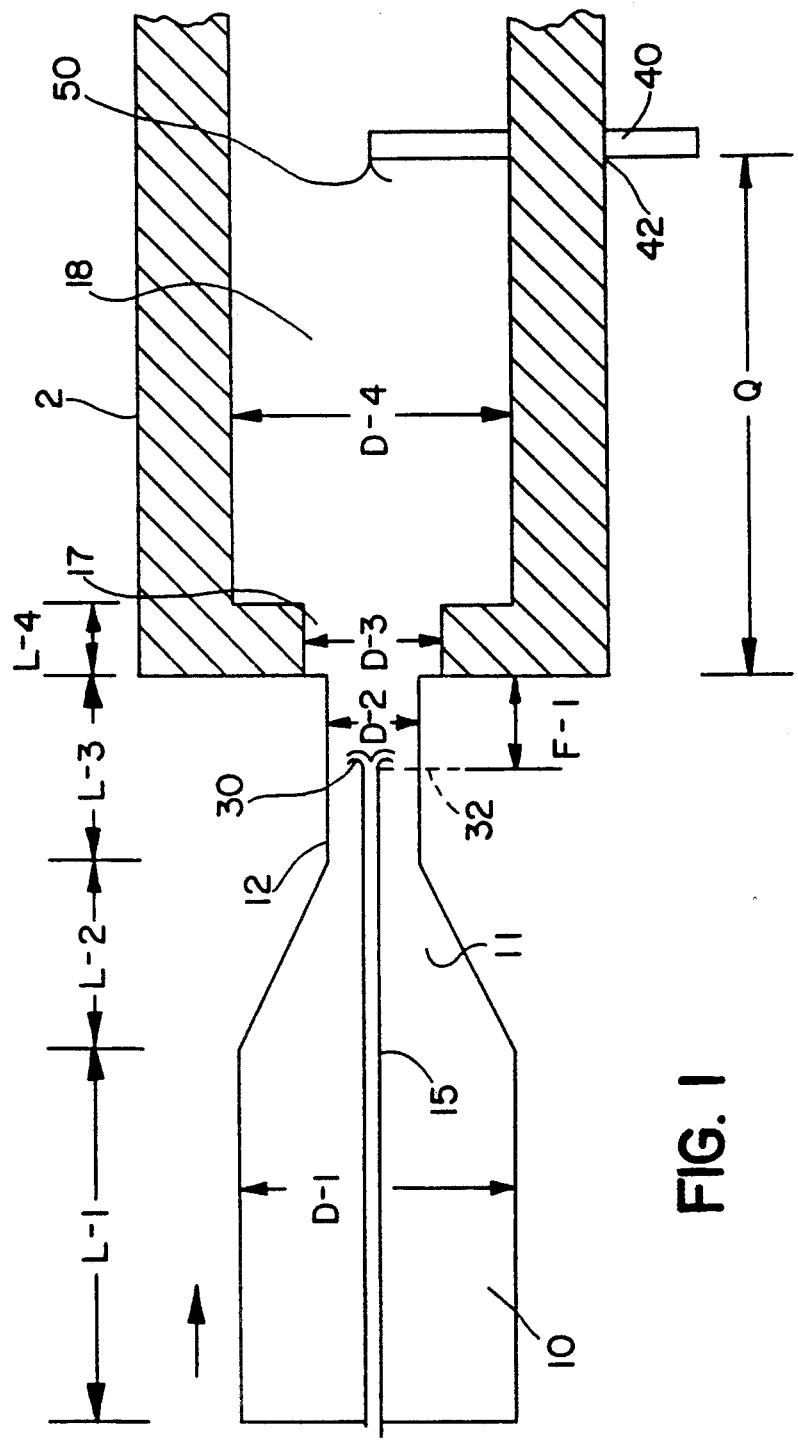
FIG. 1 is a cross-sectional view of a portion of one type of furnace carbon black reactor which may be utilized to produce the carbon blacks of the present invention.

The carbon blacks of the present invention have the following combination of analytical properties:

$45 \, m^2/g \leq CTAB \leq 55 \, m^2/g$ $48 \, mg/g \leq I_2No. \leq 58 \, mg/g$ $65\% \leq Tint \leq 75\%$ $90 \, cc/100 \, g \leq CDBP \leq 100 \, cc/100 \, g$ $122 \, cc/100 \, g \leq DBP \leq 132 \, cc/100 \, g.$ Preferably, the carbon blacks of the present invention have the following combination of properties:

$48 \, m^2/g \leq CTAB \leq 52 \, m^2/g$ $51 \, mg/g \leq I_2No. \leq 55 \, mg/g$ $68\% \leq Tint \leq 72\%$ $91 \, cc/100 \, g \leq CDBP \leq 95 \, cc/100 \, g$ $128 \, cc/100 \, g \leq DBP \leq 132 \, cc/100 \, g.$ The carbon blacks of the present invention may be produced in a modular, also referred to as "staged", furnace carbon black reactor. A section of a typical modular furnace carbon black reactor which may be utilized to produce the carbon black of the present invention is depicted in FIG. 1. Other details of a typical modular furnace carbon black reactor may be found, for example, in the description contained in U.S. Pat. No. 3,922,335, the disclosure of which is herein incorporated by reference.

Referring to FIG. 1, the carbon blacks of the present invention may be produced in a furnace carbon black reactor 2, having a combustion zone 10, which has a zone of converging diameter 11, a transition zone 12, and reaction zone 18. The end of the reaction zone 18 nearest the transition zone 12 has a zone of a restricted diameter 17. The diameter of the combustion zone 10, up to the point where the zone of converging diameter 11, begins is shown as D-1; the diameter of zone 12, as D-2; the diameter of zone 17 as D-3 and the diameter of zone 18, as D-4. The length of the combustion zone 10, up to the point where the zone of converging diameter, 11, begins is shown as L-1; the length of the zone of converging diameter, 11, is shown as L-2; the length of the transition zone, 12, is shown as L-3; and the length of the zone of restricted diameter, 17, is shown as L-4.

To produce the carbon blacks of the present invention hot combustion gases are generated in combustion zone 10, by reacting a liquid or gaseous fuel with a suitable oxidant stream such as air, oxygen, mixtures of air and oxygen or the like. Among the fuels suitable for use in reacting with the oxidant stream in combustion zone 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. The ratio of air to natural gas utilized to produce the carbon blacks of the present invention may be from about 12:1 to about 55:1, preferably 20:1 to 40:1. To facilitate the generation of hot combustion gases, the oxidant stream may be preheated.

The hot combustion gas stream flows downstream from zones 10 and 11 into zones 12, 17 and then 18. The direction of the flow of hot combustion gases is shown in the figure by the arrow. Carbon black-yielding feedstock 30, is introduced through probe 15, at point 32 (located in zone 12). Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like.

The distance from point 32 downstream to the beginning of the zone of restricted diameter 17 in the reaction zone is shown as F-1. In each of the examples described herein carbon black-yielding feedstock 30, was injected radially in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon blacks of the present invention.

The mixture of carbon black-yielding feedstock and hot combustion gases flows downstream through zones 12 and 17 into zone 18. Quench 40, located at point 42, injecting quenching fluid 50, which in the Examples described herein was water, is utilized to stop pyrolysis of the carbon black-yielding feedstock when the novel carbon blacks of the present invention are formed. Point 42 may be determined in any manner known to the art, for selecting the position of a quench to stop pyrolysis. One method for determining the position of the quench to stop pyrolysis is by determining the point at which an acceptable toluene extract level for the novel carbon blacks of the present invention is achieved. Toluene extract level may be measured by using ASTM Test D1618-83 "Carbon Black Extractables—Toluene Discoloration". Q is the distance from the beginning of zone 17 upstream to quench point 42, and will vary according to the position of the quench.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in the determination and evaluation of the analytical properties of the carbon blacks of the present invention, and the physical properties of the rubber compositions incorporating the carbon blacks of the present invention.

The CTAB of the carbon blacks was determined according to ASTM Test Procedure D3765-85. The $I_2$No. was determined according to ASTM D1510. The Tint of the carbon blacks was determined according to ASTM Test Procedure D3265-85a. The CDBP of the carbon black pellets was determined according to the procedure set forth in ASTM D 3493-86. The DBP of the carbon black pellets was determined according to the procedure set forth in ASTM D2414.

The modulus, tensile and elongation of the rubber compositions were measured by the procedure set forth in ASTM D412.

The Shore A Hardness of the rubber compositions was determined according to the procedure set forth in ASTM D-2240-86.

The extrusion shrinkage of the rubber compositions was determined by the procedure set forth in ASTM D-3674.

The viscosity of the rubber compositions was determined by the procedure set forth in ASTM D-1646.

The effectiveness and advantages of the present invention will be further illustrated by the following examples.

EXAMPLE 1

An example of the novel carbon blacks of the present invention was prepared in a reactor generally described herein, and as depicted in FIG. 1, utilizing the reactor conditions and geometry set forth in Table 2. The fuel utilized in the combustion reaction was natural gas. The liquid feedstock utilized had the properties indicated in Table 1 below:

TABLE 1

| Feedstock Properties | |
|---|---|
| Hydrogen/Carbon Ratio | 0.94 |
| Hydrogen (wt. %) | 7.20 |
| Carbon (wt. %) | 91.6 |
| Sulfur (wt. %) | 0.5 |
| A.P.I. Gravity 15.6/15.6 C(60)F [ASTM D-287] | −2.7 |
| Specific Gravity 15.5/15.6 C(60)F [ASTM D-287] | 1.099 |
| Viscosity, SUS (54.4° C.) [ASTM D-88] | 110 |
| Viscosity, SUS (98.9° C.) [ASTM D-88] | 42 |
| BMCI (Visc-Grav) | 143 |

The reactor conditions and geometry were as set forth in Table 2 below.

TABLE 2

| | |
|---|---|
| D-1, in. | 20 |
| D-2, in. | 10 |
| D-3, in. | 18 |
| D-4, in. | 45 |
| L-1, in. | 12 |
| L-2, in. | 29 |
| L-3, in. | 12 |
| L-4, in. | 9 |
| F-1, in. | 6 |
| Q, ft. | 60 |
| Oil Inj Pt. 32,) Tips # × Size, in.) | 9 × 0.096 |
| Oil Rate 32, gph | 843 |
| Oil Press. 32, psig | 160 |
| Oil Preheat, 32, °F. | 400 |
| Comb. Air, kscfh | 325 |
| Comb. Air Preheat, °F. | 1200 |
| Natural Gas, kscfh | 16.8 |
| Air/Burn Gas Ratio | 9.8 |

TABLE 2-continued

| | |
|---|---|
| K+, gK+/100 gal oil | 0.6 |
| Q Press., psi | 60 |
| Temp. at Q, °F. | 1411 |

Inj. = Injection; Comb. = combustion; Press. = pressure
32 = Point 32 on FIG. 1; gph = gallons/hour;
psi = pounds/square inch; in. = inches; ft. = feet; °F. = degrees Fahrenheit; kscfh = standard cubic feet/hour; in 1000's
K+ = potassium; gK+/100 gal oil = grams K+/100 gallons feedstock (oil)

The carbon black produced was then analyzed according to the procedures described herein. The analytical properties of the carbon black produced, after wet pelletizing and drying, and of reference carbon blacks are shown in Table 3:

TABLE 3

| | Carbon Blacks | | |
|---|---|---|---|
| | Ex. 1 | STERLING ® SO | MAF |
| CTAB (m²/g) | 52 | 44 | 52 |
| $I_2$No. (mg/g) | 55 | 43 | 57 |
| Tint (%) | 72 | 79 | 73 |
| CDBP (cc/100 g) | 91 | 84 | 85 |
| DBP (cc/100 g) | 130 | 123 | 128 |

STERLING ® SO = STERLING ® SO Carbon Black, STERLING ® is a registered trademark for carbon blacks manufactured and sold by Cabot Corporation, Waltham, Massachusetts.
MAF = a medium abrasion furnace carbon black.

EXAMPLE 2

This Example illustrates the use of the novel carbon black of the present invention in a EPDM rubber composition in comparison with rubber compositions containing the STERLING ® SO carbon black, and the MAF carbon black. Rubber composition A was made with the carbon black of the present invention produced in Example 1. Rubber composition B was made with the STERLING ® SO carbon black of Table 3. Rubber composition C was made with the MAF carbon black of Table 3. Rubber compositions A, B, and C were prepared incorporating each of the carbon black samples according to the rubber formulation shown below in Table 4.

TABLE 4

| EPDM RUBBER FORMULATION | |
|---|---|
| INGREDIENT | Part by weight |
| NORDEL 1070 | 100.0 |
| Carbon Black | 50.0 |
| SUNTHENE 4240 oil | 40.0 |
| Zinc Oxide | 5.0 |
| Stearic Acid | 1.0 |
| TMTM | 1.5 |
| MBT | 0.5 |
| Sulfur | 1.5 |

EPDM = ethylene-propylene diene monomer
NORDEL 1070 = NORDEL is a trademark of DuPont Corporation, Wilmington, Delaware for ethylene-propylene-diene terpolymers
SUNTHENE 4240 oil = a trademarked napthenic oil product of Sun Oil Co., Philadelphia, Pennsylvania
TMTM = tetramethylthiuram monosulfide
MBT = 2-mercaptobenzothiazole The static properties, and the extrusion shrinkage, of these rubber compositions were then evaluated according to the procedures described herein. The results were as shown in Table 5:

TABLE 5

| | RUBBER COMPOSITION | | |
|---|---|---|---|
| | A | B | C |
| Carbon Black | Ex. 1 | STERLING ® SO | MAF |
| Shore A Hardness | 56 | 54 | 56 |

TABLE 5-continued

| Carbon Black | RUBBER COMPOSITION | | |
|---|---|---|---|
| | A Ex. 1 | B STERLING ® SO | C MAF |
| Modulus E100 (psi) | 260 | 210 | 300 |
| Modulus E300 (psi) | 1020 | 800 | 1290 |
| Tensile Strength (psi) | 1980 | 1760 | 2160 |
| El$_b$ (%) | 530 | 560 | 480 |
| ExShrink (%) | 53 | 51 | 57 |
| Viscosity @ 100 1/s (PA · s) | 4810 | 4270 | 5880 |

*El$_b$ = elongation at break;
psi = pounds/square inch

These results show that the carbon blacks of the present invention impart reinforcement to rubber compositions to an extent comparable with the MAF carbon black while at the same time having markedly reduced extrusion shrinkage in comparison to the MAF carbon black. These results also show that the carbon blacks of the present invention impart improved reinforcement to rubber compositions in comparison with the STERLING ® SO carbon black.

EXAMPLE 3

This Example illustrates the use of the novel carbon black of the present invention in a synthetic rubber composition in comparison with rubber compositions containing STERLING ® SO carbon black, and MAF carbon black. Rubber composition D was made with the carbon black of the present invention produced in Example 1. Rubber composition E was made with the STERLING ® SO carbon black of Table 3. Rubber composition F was made with the MAF carbon black of Table 3. Rubber compositions D, E and F were prepared incorporating each of the carbon black samples according to the synthetic rubber formulation shown below in Table 6.

TABLE 6

| SYNTHETIC RUBBER FORMULATION | |
|---|---|
| INGREDIENT | Part by weight |
| SBR 1712 | 89.38 |
| CIS-1,4 BR | 35.00 |
| Carbon Black | 65.00 |
| Oil (Sundex 790) | 10.62 |
| Zinc Oxide | 3.00 |
| Sunproof Improved Stabilizer | 2.50 |
| Wingstay 100 | 2.00 |
| Stearic Acid | 2.00 |
| N-cyclohexyl-2-benzothiazolesulfenamide | 1.50 |
| 2-mercaptobenzothiazole | 0.20 |
| Sulfur | 1.75 |

SBR 1712 = an oil extended styrene-butadiene copolymer having a content of 23.5% styrene and 76.5% butadiene.
CIS 1,4 BR = a polybutadiene rubber
Sundex 790 = ASTM D2226, Type 101 oil
Sunproof Improved Stabilizer = a stabilizer
Wingstay 100 = mixed diaryl p-phenylenediamine The static properties, and the extrusion shrinkage, of these rubber compositions were then evaluated according to the procedures described herein. The results were as shown in Table 7:

TABLE 7

| Carbon Black | SBR RUBBER COMPOSITION | | |
|---|---|---|---|
| | E Ex. 1 | F STERLING ® SO | G MAF |
| Shore A Hardness | 69 | 68 | 68 |
| Modulus E100 (psi) | 681 | 673 | 779 |
| Modulus E300 (psi) | 2493 | 2491 | 2684 |
| Tensile Strength (psi) | 3338 | 3259 | 3324 |
| El$_b$ (%) | 417 | 405 | 387 |
| ExShrink (%) | 30.9 | 36.1 | 35.3 |

*El$_b$ = elongation at break;
psi = pounds/square inch

These results show that the carbon blacks of the present invention, when incorporated into SBR rubber compositions, result in rubber compositions having markedly lower extrusion shrinkage in comparison with SBR rubber compositions incorporating STERLING ® SO carbon black or MAF carbon black.

It should be clearly understood that the forms of the present invention herein described are illustrative only and are not intended to limit the scope of the invention.

We claim:

1. A carbon black having an I$_2$No. of 48-58 mg/g; a CTAB of 45-55 m$^2$/g; a Tint of 65-75%; a CDBP of 90-100 cc/100 g; and a DBP of 122-132 cc/100 g.

2. The carbon black of claim 1 wherein the I$_2$No. is 51-55 mg/g, the CTAB is 48-52 m$^2$/g, the Tint is 68-72%, the CDBP is 91-95 cc/100 g and the DBP is 128-132 cc/100 g.

3. The carbon black of claim 2 wherein the I$_2$No. is about 55 mg/g, the CTAB is about 52 m$^2$/g, the Tint is about 72%, the CDBP is about 91 cc/100 g and the DBP is about 130 cc/100 g.

4. A rubber composition comprising about 100 parts, by weight, of a rubber and from about 10 to about 250 parts, by weight, of a carbon black having an I$_2$No. of 48-58 mg/g; a CTAB of 45-55 m$^2$/g; a Tint of 65-75%; a CDBP of 90-100 cc/100 g; and a DBP of 122-132 cc/100 g.

5. The rubber composition of claim 4 wherein the wherein the I$_2$No. of the carbon black is 51-55 mg/g, the CTAB of the carbon black is 48-52 m$^2$/g, the Tint of the carbon black is 68-72%, the CDBP of the carbon black is 91-95 cc/100 g and the DBP of the carbon black is 128-132 cc/100 g.

6. The rubber composition of claim 5 wherein the wherein the I$_2$No. of the carbon black is about 55 mg/g, the CTAB of the carbon black is about 52 m$^2$/g, the Tint of the carbon black is about 72%, the CDBP of the carbon black is about 91 cc/100 g and the DBP of the carbon black is about 130 cc/100 g.

7. The rubber composition of claim 4 wherein the rubber is an EPDM rubber.

8. The rubber composition of claim 4 wherein the rubber is a synthetic rubber.

* * * * *